United States Patent
Wachenschwanz et al.

(10) Patent No.: US 7,161,753 B2
(45) Date of Patent: Jan. 9, 2007

(54) MODULATION OF SIDEWALLS OF SERVO SECTORS OF A MAGNETIC DISK AND THE RESULTANT DISK

(75) Inventors: David Wachenschwanz, Saratoga, CA (US); David Treves, Palo Alto, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 11/046,195

(22) Filed: Jan. 28, 2005

(65) Prior Publication Data

US 2006/0171051 A1    Aug. 3, 2006

(51) Int. Cl.
*G11B 5/09* (2006.01)

(52) U.S. Cl. ...................................... 360/48
(58) Field of Classification Search ................ 360/48, 360/75, 77.06, 78.07, 135, 78.09; 369/275.4, 369/47.54, 59.2, 44.13
See application file for complete search history.

(56) References Cited

U.S. PATENT DOCUMENTS

| | | | |
|---|---|---|---|
| 4,912,585 A | 3/1990 | Belser et al. ............... 360/135 |
| 5,510,939 A * | 4/1996 | Lewis ..................... 360/78.09 |
| 5,568,331 A | 10/1996 | Akagi et al. ............. 360/77.07 |
| 5,739,972 A | 4/1998 | Smith et al. ............. 360/77.03 |
| 5,828,536 A | 10/1998 | Morita ....................... 360/135 |
| 6,091,681 A | 7/2000 | Van Den Enden et al. ... 369/47 |
| 6,333,902 B1 * | 12/2001 | Shim ........................ 369/47.54 |
| 6,359,844 B1 | 3/2002 | Frank ........................... 369/32 |
| 6,433,948 B1 * | 8/2002 | Lee ............................ 360/75 |
| 6,510,015 B1 * | 1/2003 | Sacks et al. .................. 360/75 |
| 6,563,673 B1 * | 5/2003 | Mundt et al. ............... 360/135 |
| 6,624,964 B1 * | 9/2003 | Pirzadeh .................. 360/78.07 |
| 6,665,145 B1 | 12/2003 | Wada ......................... 360/133 |
| 6,748,865 B1 | 6/2004 | Sakurai et al. .............. 101/483 |
| 6,952,381 B1 * | 10/2005 | Schep et al. ............. 369/44.13 |
| 2001/0036030 A1 * | 11/2001 | Sacks et al. ................... 360/75 |
| 2002/0051315 A1 * | 5/2002 | Mundt et al. ............... 360/135 |
| 2003/0151846 A1 * | 8/2003 | Makoto ................... 360/77.06 |
| 2004/0101713 A1 | 5/2004 | Wachenschwanz et al. .......................... 428/694 |
| 2004/0114501 A1 * | 6/2004 | Kondo et al. ............ 369/275.4 |
| 2004/0170091 A1 * | 9/2004 | Schep et al. ............. 369/44.13 |
| 2004/0213119 A1 * | 10/2004 | Van Vlerken et al. ..... 369/59.2 |

FOREIGN PATENT DOCUMENTS

| | | |
|---|---|---|
| EP | 1 463 037 A2 | 3/2004 |
| EP | 1 463 038 A2 | 3/2004 |

OTHER PUBLICATIONS

Oyo Buturi, vol. 72, No. 3, Mar. 2003, The Japan Society of Applied Physics, pp. 1contents & 298-303, (no translation).

(Continued)

*Primary Examiner*—Fred F. Tzeng
(74) *Attorney, Agent, or Firm*—Silicon Valley Patent Group LLP

(57) ABSTRACT

A discrete-track-recording (DTR) disk (also called "patterned" disk) has a sectored servo formed by modulation of its sidewalls in a predetermined manner, whereas sidewalls of data sectors are not modulated in this manner. Each servo sector has two side walls that are each respectively modulated in two different ways. Hence, a readback signal from a given servo sector contains components of each of the two different modulations, even in case of "DC" erase initiation. Therefore, the just-described modulated servo sectors eliminate servowriting. Moreover, data signals are read without filtering the modulation, because data sector sidewalls are not modulated.

15 Claims, 9 Drawing Sheets

OTHER PUBLICATIONS

S.E. Lambert, et al., "Beyond discrete tracks: Other aspects of patterned media", J. Appl. Phys. 69 (8), Apr. 15, 1991, pp. 4724-4726.

Kenjiro Watanabe, et al., "Demonstration of Track Following Technique Based on Discrete Track Media", IEEE Transactions on Magnetics, vol. 29, No. 6, Nov. 1993, pp. 4030-4032.

Takehisa Ishida et al., "Discrete-Track Magnetic Disk Using Embossed Substrate", IEICE Trans. Fundamental, vol. #a76-A, No. 7, Jul. 1993, pp. 1161-1163.

Yoshikazu Soeno et al., "Feasibility of Discrete Track Perpendicular Media for High Track Density Recording", IEEE Transactions on Magnetics, vol. 39, No. 4, Jul. 2003, pp. 1967-1971.

* cited by examiner

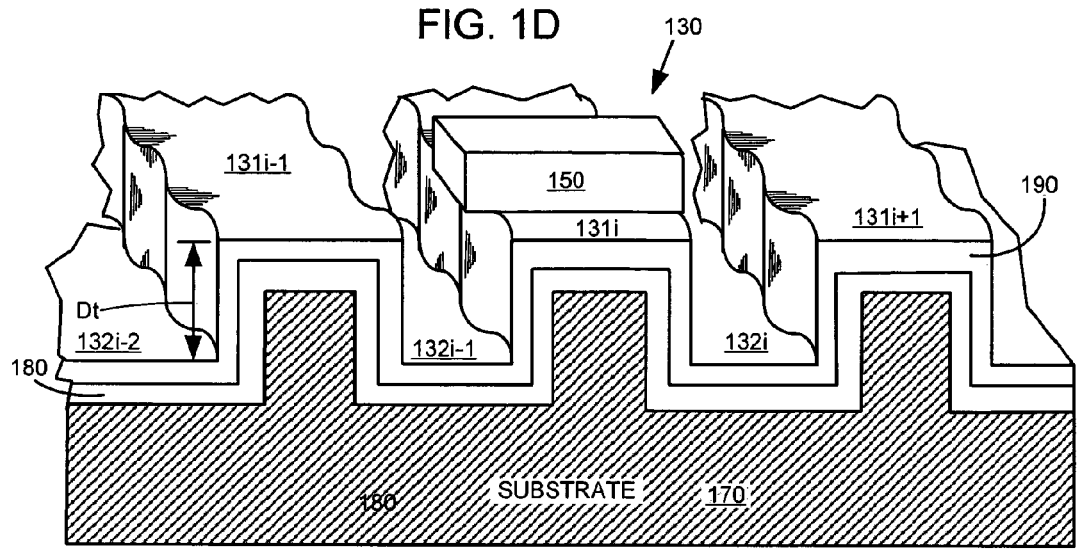
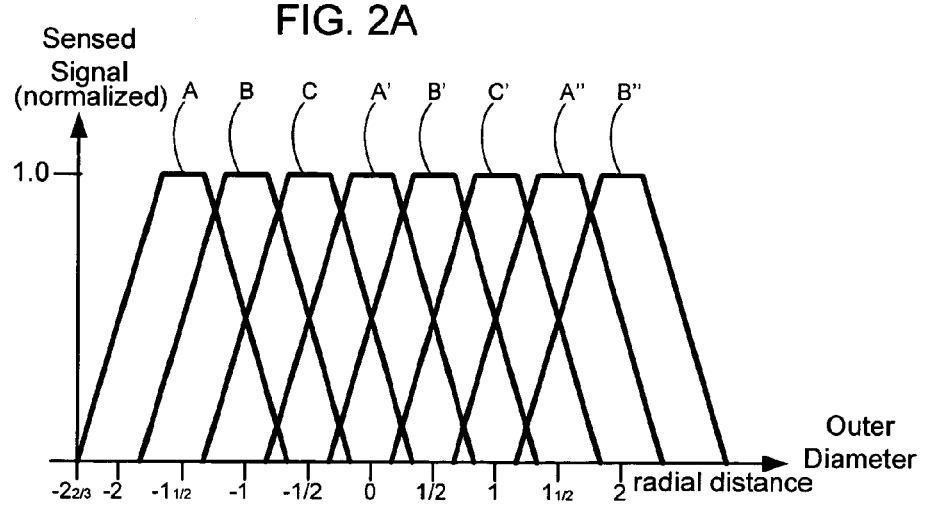

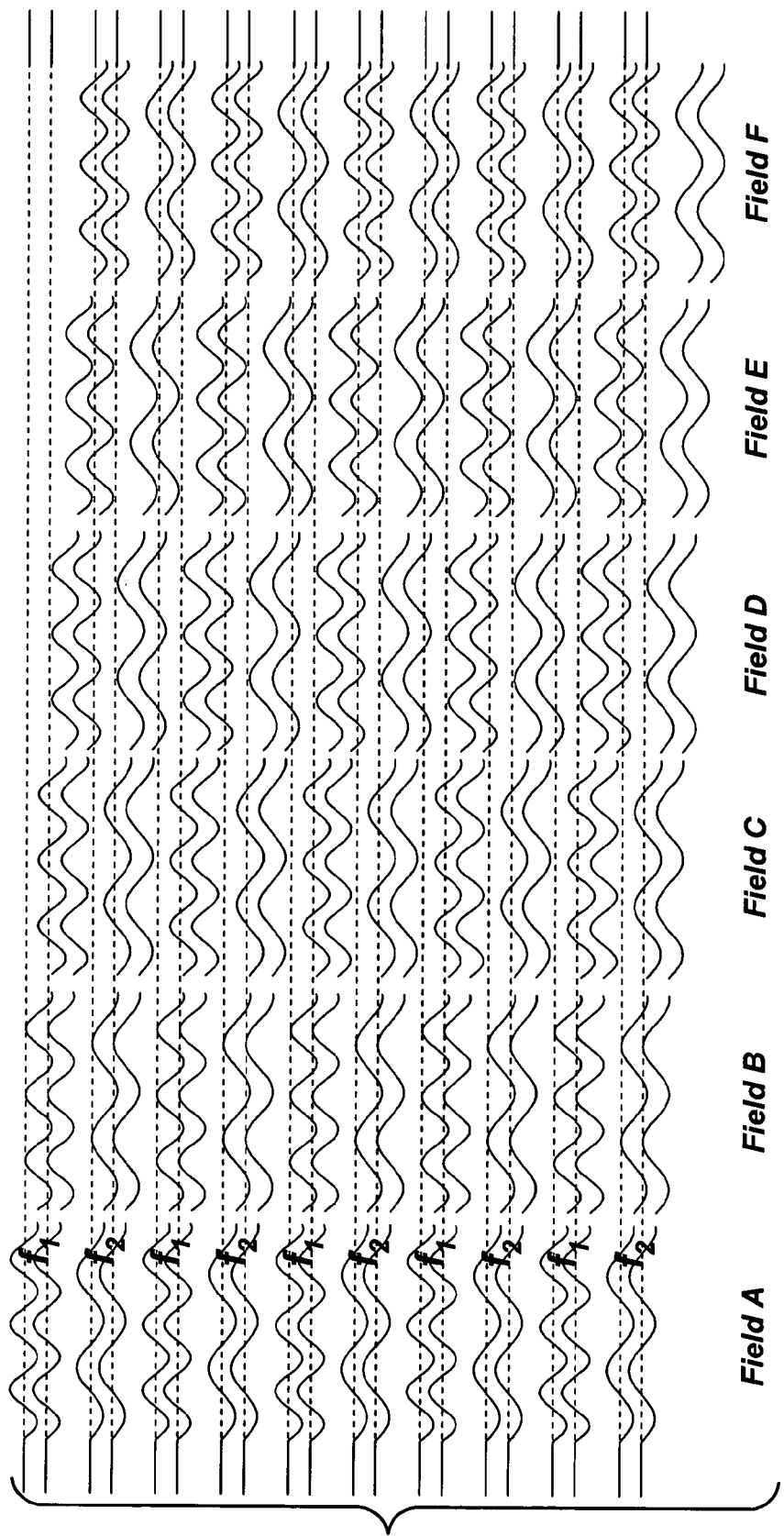

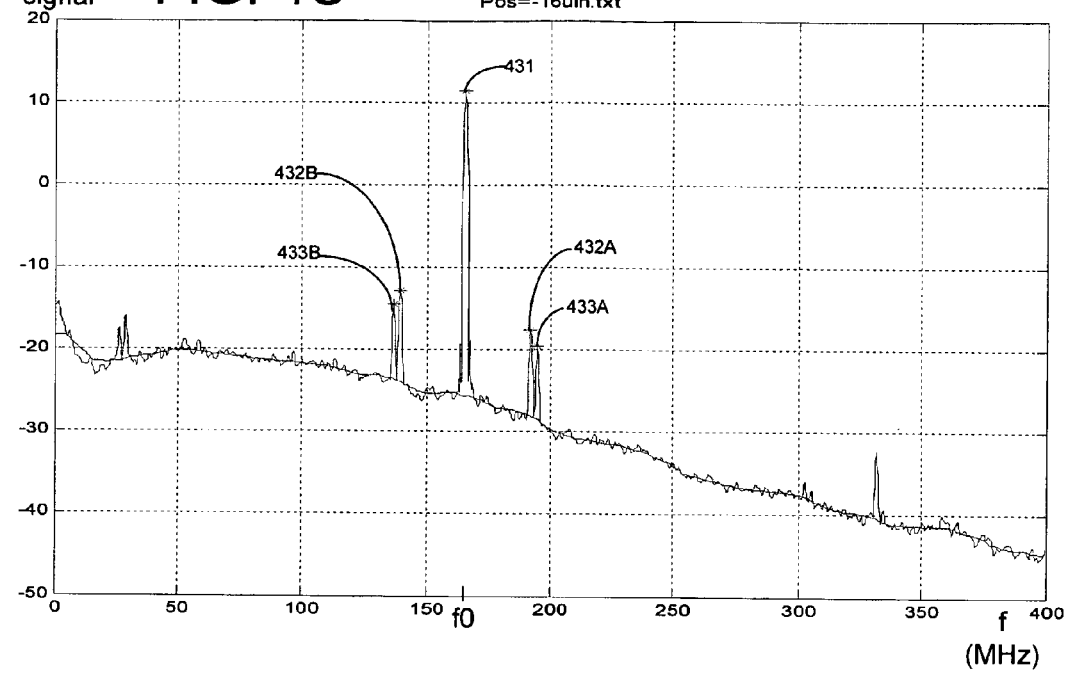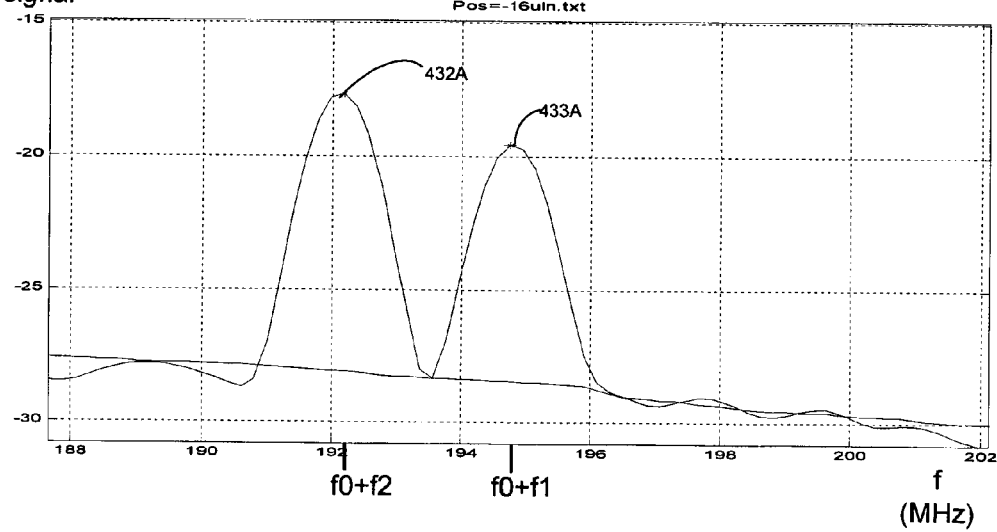

MODULATION OF SIDEWALLS OF SERVO SECTORS OF A MAGNETIC DISK AND THE RESULTANT DISK

CROSS-REFERENCE TO RELATED APPLICATION

This application is a related to U.S. patent application Ser. No. 10/077,200 filed by Michael McNeil et al. on Feb. 15, 2002 entitled "Patterned Medium" (published as US 20030179481 on Sep. 25, 2003), which is incorporated by reference herein in its entirety.

BACKGROUND

1. Field of the Invention

The invention relates to the field of magnetic disk drives, and more specifically, to patterned magnetic disks (also called "discrete track recording" disks or DTR disks) used in disk drive systems.

2. Related Art

Discrete track recording (DTR) disks or patterned magnetic disks are known in the prior art. See, for example, an article entitled "Beyond discrete tracks: Other aspects of patterned media" by S. E. Lambert, I. L. Sanders, A. M. Patlach, M. T. Krounbi, and S. R. Hetzler, published in Journal of Applied Physics Vol 69(8) pp. 4724–4726. Apr. 15, 1991. Specifically, this article states that the surface of a thin-film disk can be patterned using standard lithographic techniques to form discrete tracks as narrow as 0.5 µm. These studies have been extended to patterns formed when an etched track is broken into discrete segments by etching away some portions of a discrete track. Abrupt changes in magnetization are obtained by DC erasing the medium, giving readback signals with ~50% of the amplitude of conventional transitions when the gap of the readback head is aligned with the edge of the media pattern.

See also another article entitled "Fabrication and magnetic properties of patterned magnetic recording media" by Tsutomu AOYAMA, Isamu SATO and Shunji ISHIO, published in OYO BUTURI, Vol. 72, No3, p. 0298–0303 (2002). According to this article, discrete track media improve the side writing and side reading phenomena which would be serious problems in conventional continuous magnetic film media at very high track densities. Discrete bit media have a potential of realizing thermally stable magnetic recording beyond 1 Tbit/in$^2$. A fabrication method that involves the use of the combination of nanoimprint and RIE is presented in this article, and magnetic properties of fabricated samples are discussed.

DTR disks should allow manufacturers to pre-format the head position servo information on the disk at the time of disk manufacturing. Also, pre-formatted servoing information may cause a disruption in fly height of a head as it flies over a preformatted area on a DTR disk.

Accordingly, inventors of the current patent application believe that a new servo structure is needed that does not affect the fly height even for the case with a preformatted dedicated servo area.

U.S. Pat. No. 5,739,972 (incorporated by reference herein in its entirety) describes a storage medium in which servo information is recorded in serrated edges of each data track. A thermal component of a MR head's readback signal is extracted and used for servoing. Specifically, as the MR head moves closer towards an outer edge that is serrated at frequency f1, a thermal signal at frequency f1 increases. When the MR head is positioned at the center of a track, the thermal frequency responses from the two serrated edges of the track are near zero. Note that U.S. Pat. No. 5,739,972 requires serrated edges to be present along the entire length of a track, and the track is not apportioned into data sectors v/s servo sectors. Therefore, a readback signal from such a system contains the data signal as well as the servo signal, at all locations along a track.

SUMMARY

In accordance with the invention, sidewalls of a land in only servo sector(s) in a discrete-track-recording (DTR) disk are modulated in space in a predetermined manner, whereas sidewalls of the same land in the data sector(s) are not modulated in the said predetermined manner. Sidewalls are actually unmodulated in data sectors while being modulated in servo sectors, in such embodiments of the invention. Note that, depending on the embodiment, DTR disks may be of two classes: one with groove modulation in the servo sector only, and another with groove modulation in both the servo sector as well as data sector.

In many embodiments, in a servo sector, a land in the DTR disk has two side walls that are each spatially modulated, e.g. by oscillating the location of each sidewall at one or the other of two different frequencies f1 and f2. A readback signal from a given servo sector contains the modulation (e.g. components at these two frequencies f1 and f2), even if the disk is DC erased (e.g. by magnetizing in a single direction). The just-described servo sectors with spatially modulated sidewalls eliminate the need for servowriting of the type required in prior art.

Note that no signal is read back from the data sectors of a disk after it is DC erased in embodiments wherein the land's sidewalls are un-modulated in the data sectors. In such embodiments, data signals are read without any filtering. In other embodiments, even though the data signals are filtered, they are not filtered to remove the just-described modulation (e.g. signals at frequencies f1 and f2), because in the data sectors, the land's sidewalls are not modulated at all or not modulated as in the servo sector(s).

BRIEF DESCRIPTION OF THE FIGURES

FIG. 1D illustrates, in a cross-sectional three dimensional view along the direction 1D—1D in FIG. 1B, an exemplary structure of the disk of FIG. 1B FIG. 2A illustrates, in a graph, overlaps in position error signal (PES) between three fields "A", "B" and "C" of a servo sector in some embodiments of the invention.

FIG. 2C illustrates a servo sector with six radially-offset fields "used to implement an overlapping PES signal of the type illustrated in FIG. 2A in an alternative embodiment.

FIGS. 4C and 4D illustrate, in a graph, a signal (on the y axis) resulting from spatial modulation of sidewalls wherein the magnetic layer is magnetized with a carrier frequency f0, as sensed (FIG. 4C) and amplified (FIG. 4D), as a function of frequency (on the x axis).

DETAILED DESCRIPTION

Figure 1A:
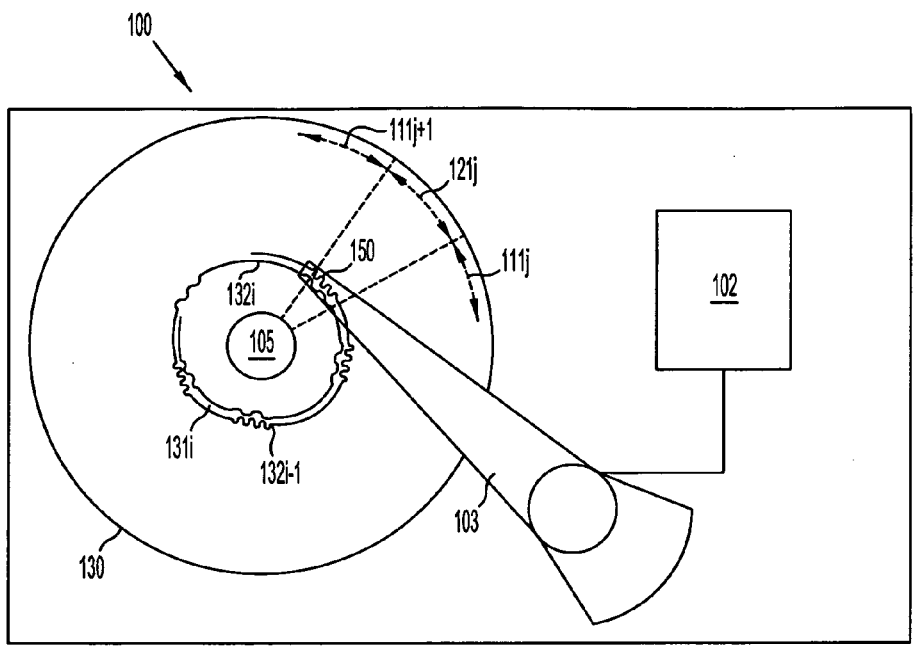
FIG. 1A illustrates, in a block diagram, a magnetic disk drive that has a land with sidewalls in a servo sector 121*j* that are modulated in accordance with the invention as illustrated in detail in FIG. 1B.

A discrete-track-recording disk 130 (FIG. 1A) has a number of areas that hold a signal (called "lands") 131$i$−1, 131$i$, 131$i$+1 (see FIG. 1B) that are separated from each other by areas (called "gaps") 132$i$−1 and 132$i$ that inhibit storage of data. A land area 131$i$ is also referred to as a "track." Note that gap area 132$i$ is implemented in many embodiments of disk 130 by a trough which is a physically recessed area (relative to land area 131$i$) as shown in FIG. 1D, although in alternative embodiments gap area 131$i$ is implemented as an area that is at the same elevation as the land area but contains a material that cannot be magnetized. The unmagnetizable material may be created, in disk 130 of such alternative embodiments, by ion implantation.

Each land area 131$i$ (FIG. 1A) in disk 130 is formed in multiple sectors, such as servo sector 121$j$ (FIG. 1A) that is used in positioning a head relative to the disk. Servo sector 121$j$ is located between two data sectors 111$j$ and 111$j$+1 whose lands hold data in the normal manner, i.e. data being stored in the magnetic domains formed in a magnetic layer of the disk.

Figure 1B:
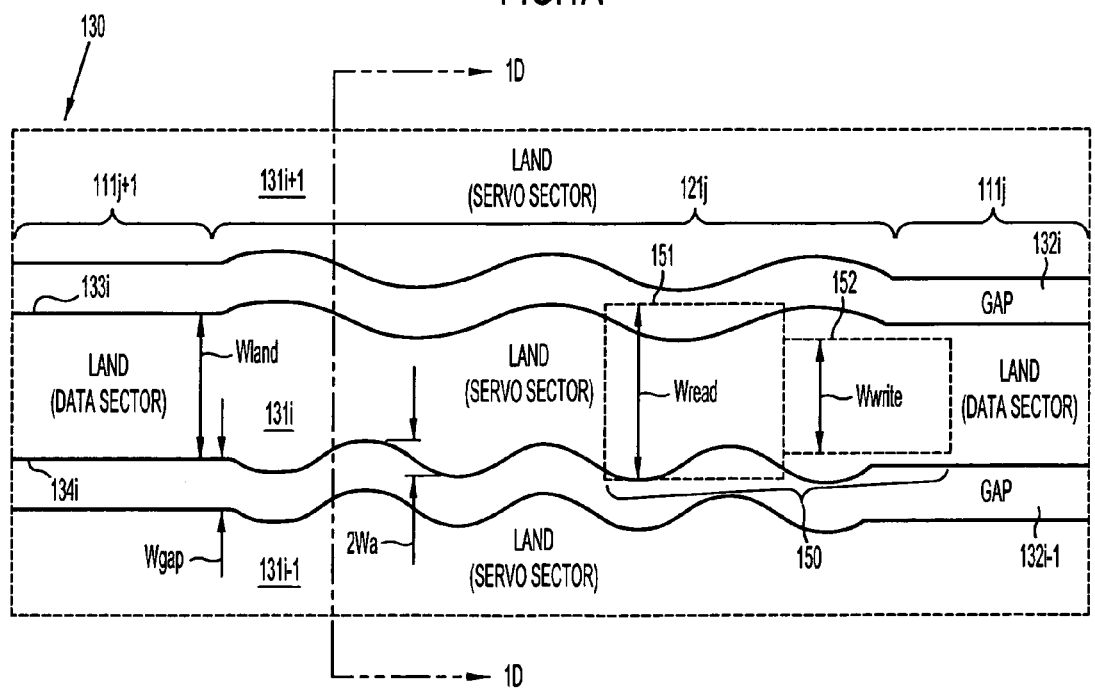
FIG. 1B illustrates, in an enlarged view, a region of disk 130 of FIG. 1A under arm 103 of the magnetic disk drive, showing modulated sidewalls in servo sector 121*j* located between unmodulated sidewalls in data sectors 111*j* and 111*j*+1.

In accordance with the invention, land 131$i$ has two sidewalls 133$i$ and 134$i$ (FIG. 1B) defined by gap areas 132$i$ and 132$i$−1 between which land 131$i$ is located. Sidewalls 133$i$ and 134$i$ are spatially modulated in servo sector 121$j$, but these same sidewalls are kept unmodulated in data sectors 111$j$ and 111$j$+1. The spatial modulation of each sidewall in a servo sector can be any known change from the location of the same sidewall in a data sector and which known change is recognized in signals sensed by circuitry 102. In some embodiments, wall 134$i$ in FIG. 1B is spatially deformed from its normal baseline (e.g. which baseline is circular or spiral relative to a center of disk 130) in data sector 111$j$ into a waveform in servo sector 121$j$ that oscillates (e.g. in a sinusoidal manner) in space relative to the normal baseline. Similarly, wall 133$i$ in FIG. 1B is also spatially deformed in this manner, although its frequency of oscillation is different from the frequency of wall 134$i$.

The spatial modulations of the two sidewalls 134$i$ and 133$i$ are deliberately made to be different from each other, and circuitry 102 is designed to distinguish between signals sensed by a read element 151 of a head 150 when flying over land 131$i$. Note that head 150 flies over disk 130 due to relative motion therebetween, primarily caused by rotation of disk 130 by a motor 105. Head 150 is normally held stationary (relative to the rest of the disk drive) by actuator arm 103, when flying over a specific land 131$i$.

In the above-described example, the two sidewalls 133$i$ and 134$i$ of land 131$i$ are modulated in a sinusoidal manner at two different frequencies f1 and f2 respectively, and circuitry 102 distinguishes between components of the readback signal at these two specific frequencies. Moreover, circuitry 102 of this embodiment uses a difference in amplitude, between the components at these two frequencies f1 and f2, to determine a position of head 150 relative to land 131$i$. Although a distinction between signals generated by sidewalls 133$i$ and 134$i$ is based on frequency modulation in this example, other embodiments may use other types of modulation (e.g. phase modulation).

Figure 3A:
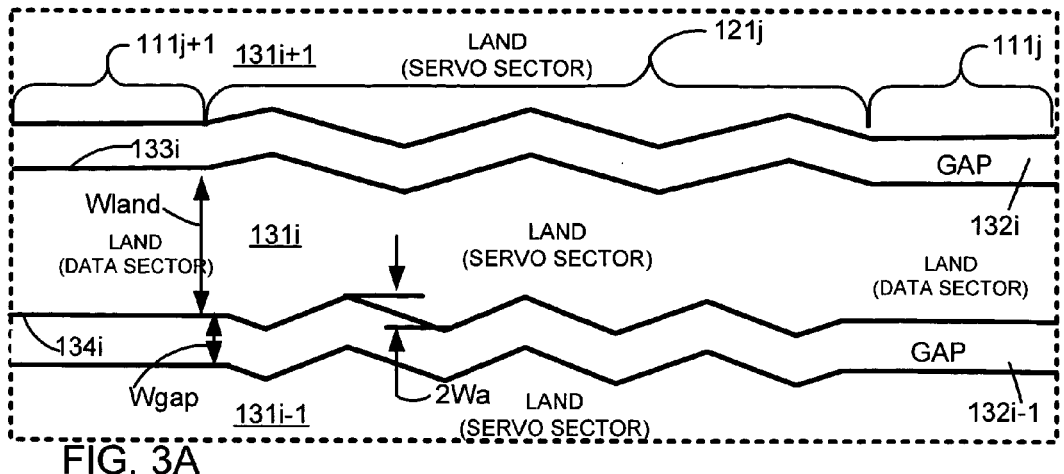
FIGS. 3A–3C illustrate alternative embodiments of a disk of the type shown in FIG. 1B A using spatial modulations other than sinusoidal.
Figure 3B:
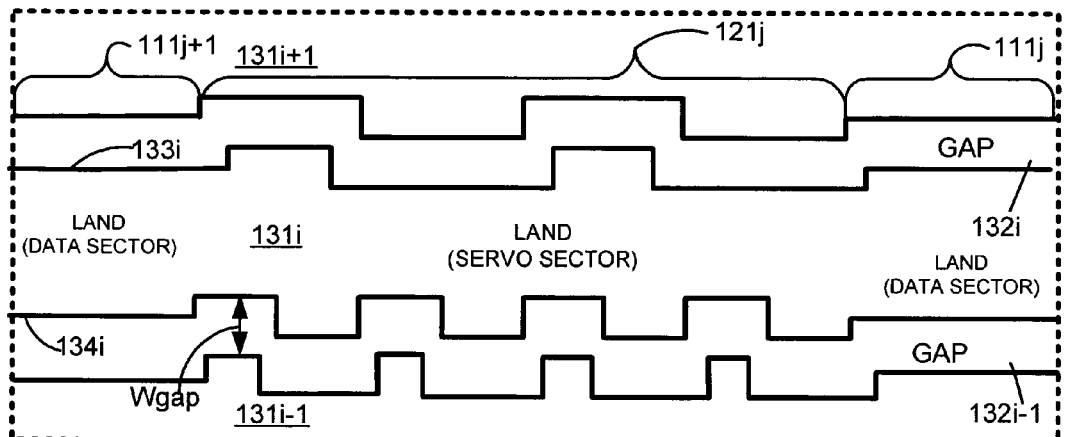
Figure 3C:
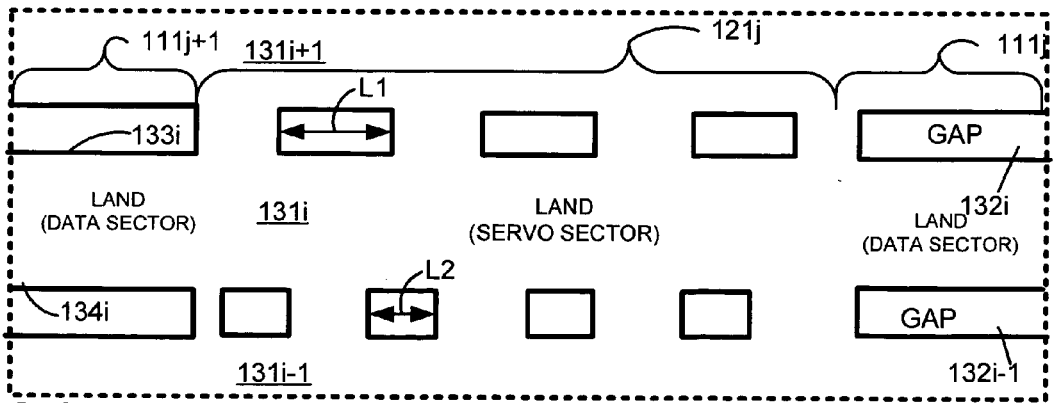

Moreover, although sinusoidal waveforms are illustrated in FIG. 1B as the modulation in servo sector 121$j$, the waveforms may have any other oscillating shape, such as square wave (FIG. 3A), or triangular wave (FIG. 3B) or any arbitrary shape (not shown) that is predetermined, depending on the embodiment. Specifically, walls 134$i$ and 133$i$ may be spatially modulated, in servo sector 121$j$, into any shape such as a chirp (FIG. 3C) or spread-spectrum even if the shape is not oscillating. To summarize, a sidewall's specific shape in space, in servo sector 121$j$, can be anything, as long as the signal generated therefrom in read element 151 is recognized in circuitry 102.

Moreover, although the same sidewall is kept unmodulated in the data sector of many embodiments, in alternative embodiments the data sector sidewall may also be spatially modulated relative to the baseline (in the form of a spiral or a circle) about which oscillates the location of the same sidewall when located in the servo sector. In the just described alternative embodiments, the modulation of a sidewall 133$i$ in data sectors 111$j$ and 111$j$+1 is made sufficiently different from its modulation in servo sector 121$j$, in order to enable circuitry 102 to distinguish therebetween. In an example of the alternative embodiments, sidewalls 133$i$ and 134$i$ are modulated in a sinusoidal manner at the respective frequencies f1 and f2 in servo sector 121$j$, and these same sidewalls are also modulated in sinusoidal manner at respective frequencies f3 and f4 in data sectors 111$j$ and 111$j$+1. As noted above, f3 and f4 are equal to zero in most embodiments, which do not modulate sidewalls 133$i$ and 134$i$ in data sectors 111$j$ and 111$j$+1.

The distance between centerlines of sidewalls 133$i$ and 134$i$ of a land 131$i$ defines a width Wland (FIG. 1B). In certain embodiments, the width of a read element 151 of magnetoresistive head 150 (shown dashed in FIG. 1B) is approximately same as or larger than land width Wland. The word "approximately" is meant to denote any number sufficiently close to ensure efficacy in the functionality of head 150 in sensing the modulation of the two sidewalls of a land over which head 150 is centered in a servo sector. The specific width Wread of a read element 151 is determined in some embodiments from routine experimentation with read elements whose widths are selected to be within ±10% of land width Wland. In many embodiments, the read element's width Wread is smaller than the following upper limit:

$$Wread\text{-}max = Wland + 2*GAP - 2*RTMR$$

wherein "TW" is track width, "GAP" is the width of a gap and RTMR is the read track misregistration. Moreover, in some embodiments the read element, is made smaller than land width, and the lower limit for the read element's width Wread is $$Wread\text{-}min = (\tfrac{1}{2}*Wland).$$

The read element 151 is made sufficiently wide to sense the spatial modulation of each of the two sidewalls of a land 131i in at least one field of a servo sector in accordance with the invention.

Note that although certain limits have been described in the previous paragraph, the specific dimensions of read element 131i are different in different embodiments, and in many embodiments the dimensions are determined primarily by other considerations such as the design of data sectors 111j and 111j+1. To the extent the design of the servo sector 121j is taken into account in some embodiments, the design of read element 131i also depends on the sensitivity (or lack of sensitivity) of a disk drive's circuitry 102 to signals sensed from the spatial modulation of the two sidewalls (and the sensitivity is found from experimentation in many embodiments), and also depending on the noise in the sensed signals. In most embodiments, the signals sensed from the two side walls have sufficient signal to noise ratio (SNR) for drive circuitry 102 to position a center line of read element 151 at the center of a land 131i (e.g. centered within a predetermined uncertainty thereof, depending on the embodiment).

Moreover, in some embodiments, the width Wwrite of a write element 152 in head 150 is selected to be within certain limits based on track width "Wland" (b) width of a gap "GAP" and (c) write element track misregistration "WTMR". The minimum limit Wwrite-min and the maximum limit Wwrite-max on the width Wwrite of the write element 152 of some embodiments are expressed as follows:

$$W\text{write-min}=W\text{land}+WTMR$$

$$W\text{write-max}=W\text{land}+2*GAP-WTMR$$

Each of the two TMRs, namely the Write TMR (WTMR) and the Read TMR (RTMR) both define the maximum range of the misalignment of the respective elements 151 and 152 that is probable during the normal track following operations of head 150 in a disk drive.

Note that the pitch between tracks is (Wland+GAP), and its value depends on the embodiment. For example, in some embodiments, pitch is 300 nanometers, although other embodiments may use a pitch as large as 500 nanometers or as small as 50 nanometers. The specific value of the pitch in any given embodiment depends on the design of a specific drive.

In many embodiments, land width Wland may be selected to be, for example, one half pitch or three-fourths pitch. Depending on the embodiment, land width Wland may be selected to have any value in the range 40% to 90% of pitch. Moreover, gap width GAP may be selected, in conformance with the above-described relationships, to be anywhere between 10% to 60% of pitch. Also, depending on the embodiment, the amplitude Wa through which a sidewall 134i of a land 131i is modulated in a servo sector 121j may be selected to be any value up to one half of width Wland of land 131i, which is expressed as follows:

$$0<Wa\leq(0.5*W\text{land})$$

Note that a maximum distance M through which sidewall 134i oscillates in space (assuming an oscillating waveform is used in modulation) is 2*Wa (see FIG. 1B).

In the illustrations shown in FIGS. 1A and 1B, servo sector 121j with spatially modulated sidewalls is sandwiched between two data sectors 111j and 111j+1 that have unmodulated sidewalls. Spatial modulation of sidewalls 133i and 134i of a land 131i in a servo sector 121j, without modulation of the same sidewalls in the data sectors 111j and 111j+1, has the advantage that data signals from land 131i are used without filtering for the servo sector modulation, and hence a portion of the circuitry 102 that handles data signals is unchanged from its normal design, even when using disks with servo sectors of the type described herein. Moreover, a readback signal from land 131i in servo sector 121j, even in case of "DC" erase initiation, yields components at spatial frequencies f1 and f2 at which each of the two sidewalls 133i and 134i are modulated.

In many embodiments of the invention, two walls 133i and 134i of a land 131i are modulated at two slightly different spatial frequencies, e.g. wall 133i is modulated at frequency f1 and wall 134i is modulated at frequency f2. Therefore, a readback signal, which is sensed as a change in magnetic field by read element 151 when flying over servo sector 121j, contains both frequencies f1 and f2. Note that the readback signal sensed by read element 151 is formed by changes in magnetic field caused by spatial modulation of walls 133i and 134i of land 131i. Hence any head 150, that is designed in the normal manner, detects such changes in magnetic field when flying over servo sector 121j.

Furthermore, head 150 in accordance with the invention is also designed in the normal manner, to screen out or minimize signals due to thermal effects. This is in contrast to U.S. Pat. No. 5,739,972 which requires their head to be sensitive to and detect thermal effects caused by serrated edges of a land. Note that disk 130 of several embodiments of the current invention is magnetized (e.g. DC erased) to generate a predetermined magnetic response in head 150.

Figure 1C:
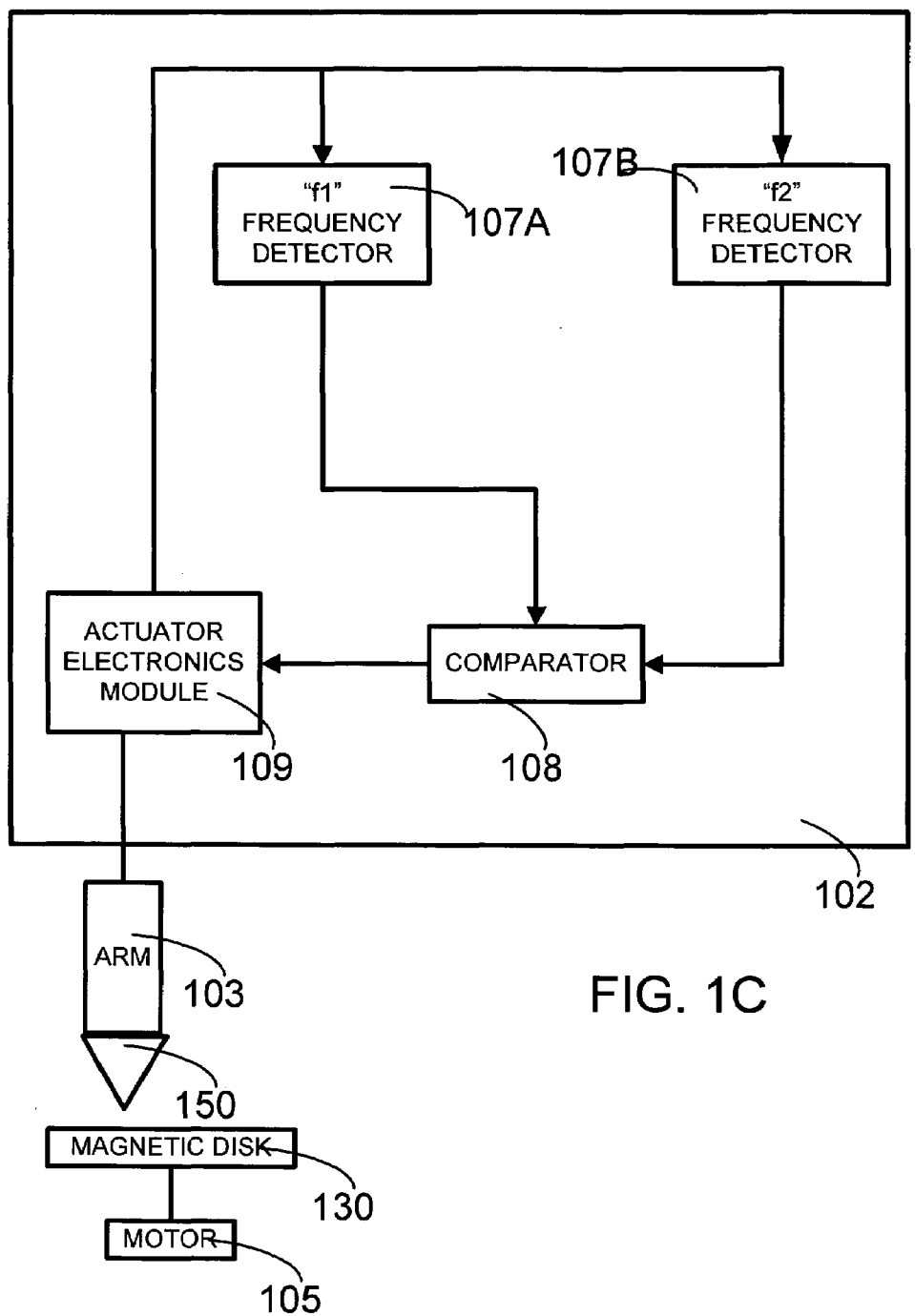
FIG. 1C illustrates, in a block diagram, circuitry in the magnetic disk drive of FIG. 1A.

As illustrated in FIG. 1C, signals at these two frequencies f1 and f2 may be detected in detectors 107A and 107B that are included in circuitry 102 (FIG. 1A). If amplitudes Wa of the spatial modulation in the two sidewalls of a land in each servo sector are the same, then the amplitudes of the readback signal at these frequencies f1 and f2 may be directly compared against each other by a comparator 108 also included in circuitry 102. A difference between the signals at the two frequencies is supplied by comparator 108 as a position error signal (PES) to an actuator electronics (AE) module 109 inside circuitry 102. AE module 109 controls the location of an arm 103, on which head 150 is mounted, in the normal manner (in response to the PES signal).

Note that in many embodiments described herein, disk 130 contains one or more layers of magnetic materials. For example, a layer 180 of magnetic material is shown in FIG. 1D as being present over a substrate 170. Substrate 170 can be, for example, (a) plated nickel phosphorous on aluminum manganese or (b) glass. A protection layer 190 may be located over the magnetic layer 180. Note that the structure shown in FIG. 1D is merely illustrative, and there may be additional layers or fewer layers, depending on the embodiment.

Magnetic layer 180 may be formed of, for example, cobalt chrome platinum formed by sputtering on substrate 170. Note that the trough depth Dt of disk 130 in some embodiments of the invention may be in the range of 5 nm to 100 nm depending on the embodiment. In some embodiments disk 130 is formed using nano-implant lithograph (NIL), as described in, for example, U.S. patent application Ser. No. 10/077,200 which has been incorporated by reference above.

The above-described stamper is formed from a master disk in which gaps are defined by troughs formed by an electron beam, in a manner commonly used in "NIL" methods except for the following difference. The electron beam is moved radially inwards and outwards (in addition to its tangential motion), during the formation of a trough (to implement a gap) in a servo sector, thereby to create the spatial modulation. The just-described inward and outward movement of the electron beam may be implemented in some embodiments by changing the voltage on a condenser, in the normal manner.

The frequency of movement of the electron beam in the radial direction in a field of a servo sector is one of f1 or f2, and in some embodiments it depends on the other of f1 or f2 that has been used in forming an adjacent trough. Specifically, if a disk has circular troughs that separate circular lands from one another in the data sectors (i.e. circular tracks), then a trough in some embodiments may have a single spatial oscillation frequency for all servo sectors. In other circular track embodiments, the spatial oscillation frequency of a trough is different in adjacent servo sectors (e.g. f1 in one servo sector and f2 in each of two servo sectors that precede and follow the one servo sector). In embodiments that have spiral tracks (as shown in FIG. 1A), the oscillation frequency is kept the same (e.g. f1) in all servo sectors for 360° of rotation by the electron beam followed by switching to the other oscillation frequency (e.g. f2) in all servo sectors for another 360° of rotation, and then repeating the just-described acts. Note that although only five servo sectors are shown in FIG. 1A for 360° of rotation, there are typically about 100 servo sectors in many embodiments although as many as 200 or even 300 servo sectors may be used depending on the embodiment.

To ensure proper formation of oscillating sidewalls of a land in a disk, a resist that is exposed on a master disk of some embodiments is preselected for tolerating a sufficiently large variation in exposure rate. This is because in such embodiments the electron beam is moved at a higher speed when moving radially inwards and outwards to create a trough (that defines a gap) having modulated sidewalls in the servo sector, while an unmodulated trough is formed by the electron beam's slower movement through data sectors (which is at a substantially fixed linear velocity).

Note that in some embodiments frequencies f1 and f2 although different from one another are selected to be sufficiently close to one another, e.g. they may be selected to be within 50% of one another. The closeness of frequencies f1 and f2 in such embodiments ensures that the signals from the two frequency detectors 107A and 107B (FIG. 1C) become available for comparison with one another at about the same time. In contrast, if frequency f1 is several times frequency f2 (as is the case in some alternative embodiments), then the signal from detector 107A becomes available several time periods before the signal from detector 107B. Hence, frequency f1 being several times frequency f2 requires the servo sector of such alternative embodiments to be much larger than it needs to be in embodiments wherein f2 is approximately the same as f1.

Alternative embodiments may use any two signals whose modulations (e.g. frequencies and/or amplitudes) are distinguishable from one another. Also, in some embodiments, the spatial wavelength (and hence frequency f1 or f2) of a periodic modulation of a sidewall (e.g. in a square wave shape) is selected to be large compared to the width of a trough, for reasons of beam resolution and power control in using an electron beam to form the gaps.

Although some embodiments use a simple servo sector of the type illustrated in FIG. 1B, in many embodiments each servo sector has multiple patterns, e.g. three patterns, four patterns or five patterns. For example, FIG. 2A illustrates the signal sensed from a servo sector containing three patterns, such as field A, field B and field C that overlap one another so that the resulting signal (which is used to form the PES signal described above) provides almost continuous coverage, as a function of radial distance from the center of the disk, across multiple tracks. Specifically, as shown in FIG. 2A, field A overlaps field B, and field B in turn overlaps field C. Note that in the illustration shown in FIG. 2A, the radial distance is in units of track pitch (i.e. distance between centers of two adjacent lands), e.g. the number "2" along the x-axis represents two track pitches. Moreover, along the y-axis the sensed signal is typically measured in micro-volts, and this signal is shown normalized in FIG. 2A.

Figure 2B:
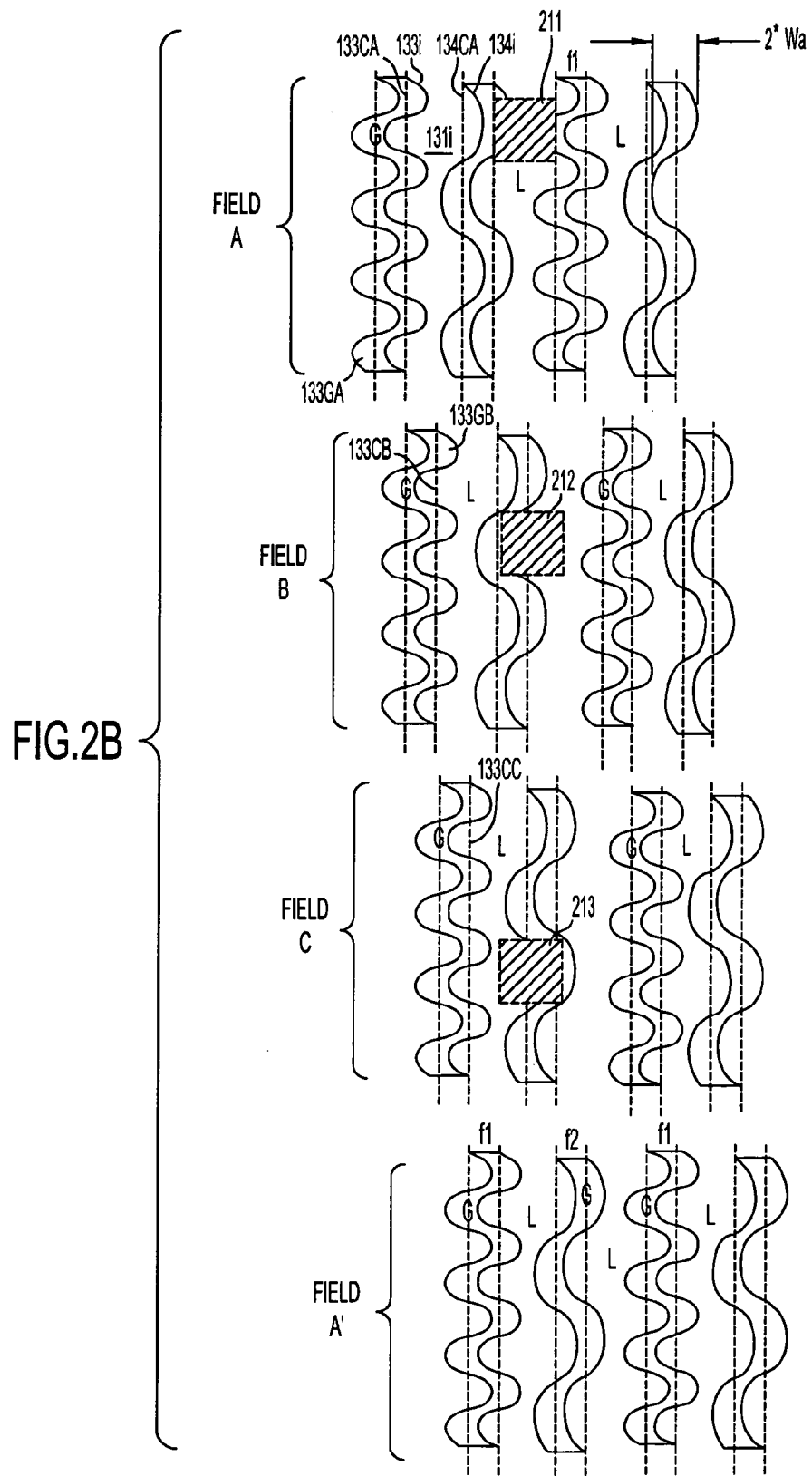
FIG. 2B illustrates, in an enlarged view, the three radially-offset fields located in a servo region of the type shown in FIG. 1B, used to implement the overlapping PES signal of FIG. 2A in one embodiment.

Overlapping fields A–C illustrated in FIG. 2A may be implemented in accordance with the invention by radially offsetting the location of a line at which the data land's sidewalls are located. Note that at the top of FIG. 2B, before field A begins, one data land's two sidewalls are located at lines 133CA and 134CA. The two lines 133CA and 134CA at which the adjacent data land's sidewalls are located are normally either circular or spiral, when viewed relative to the entire disk although they are shown almost linear in FIG. 2B because their curvature is small at the magnification at which FIG. 2B is illustrated. These two lines 133CA and 134CA form the centerlines of modulations (such as sinusoidal deviations) of servo land 131*i*'s two sidewalls in field A. The two sidewalls 133*i* and 134*i* (that are sinusoidal in this example, relative to lines 133CA and 134CA) together define a single field "A" in a servo sector in accordance with the invention.

The just-described single field is typically not sufficient in most embodiments, and in such embodiments additional fields are formed in a manner similar to field A as described above. Specifically, in some embodiments, center line 133CB of sidewall 133*i* in a second field B is at a radial offset from the corresponding center line 133CA in field A. The offset is an integral fraction 1/N of the pitch, wherein N is an integer. The smaller the fraction, the larger the overlap of signals, between the fields, and the better the continuity in the servo signal as the head crosses the tracks. For example, the sidewall 133CB in second field B may be at the radial location of a center line (not shown) of land 131*i* in first field A. Also, in a third field C, the just-described center line 133CC of sidewall 133*i* may be at the same radial location as the radial location of a center line (not shown) of sidewall 134*i* in first field A. Note that in FIG. 2B, a gap 133GA in first field A that defines sidewall 133*i* is not continuous with a corresponding gap 133GB in second field B due to the process used to form these gaps (e.g. if formed by switching off an electron beam when making a master disk).

The distance through which lines 133CA and 133CB are radially separated (i.e. the locations at which the respective sidewalls are centered) in the adjacent fields "A" and "B" depends on many factors, such as the number of servo fields used to form the PES signal, the amount of real estate available for servo fields, the pitch of the tracks, the complexity of the servo circuitry in a disk drive that uses the just-described disk, and other drive design parameters. FIG. 2C illustrates the modulated sidewalls of a servo sector in an alternative embodiment that uses six fields.

Head 150 when flying over land 131*i*+1 at location 211 senses both frequencies f1 and f2 in field A (and the sensed signals at the two frequencies are equal when the head is centered over the land). Head 150 when at location 212 senses only frequency f1 in field B (and the sensed signal is maximum when the edge of the reading element in the head is at the maximum excursion in the edge of the land towards the gap). Head 150 when at location 213 senses frequencies f2 and f1 in field C. The amplitude of signals at the two frequencies that are sensed in flying across a multiple field servo sector of the type illustrated in FIG. 2B provides a better PES signal than flying across a single field servo sector of the type illustrated in FIG. 1B.

In one cycle of fields of the type illustrated in FIG. 2B, the fields "A", "B", and "C" are displaced in the direction of head travel (i.e. in the azimuthal direction) to separate them in time, and radially by a pitch (the servo pitch) that is a fraction of the data track's pitch. The next cycle covers identical azimuthal positions, but is displaced radially by one data track, as illustrated by the field A' in FIG. 2B. In one cycle, a given frequency (e.g. f1) is on the left side of a land, while in the next cycle, that given frequency (e.g. f1) is now on the right side of the land. Hence, the relative positions of the two frequencies f1 and f2 are used to identify "odd" and "even" tracks. For example, an "odd" track has frequencies f1 and f2 on the left and right side respectively while an "even" track has frequencies f2 and f1 on the left and right side respectively.

Note that when the servo signal from an active servo field reaches a prescribed amplitude (indicating that the head is centered relative to the land), the servo electronics in circuitry 102 locks on to the appropriate azimuthally adjacent field. Therefore, the servo pitch is kept small in many embodiments, to obtain a good overlap of the position error signal from field to field. The multiple servo fields A–C and A'–C' ensure that a head is located at the center of a land 131$i$ (FIG. 2B), and additional information is read to identify the specific track (from among many tracks) on which the head is located.

Examples of servo fields are illustrated in terms of the following parameters: if Wland is track width and GAP is gap width, then pitch P=Wland+GAP. Moreover, wobble amplitude Wa is kept substantially smaller than Wland/2 to avoid interference between the two edges of the track. If N is the number of servo fields in one cycle (an integer), then SP=P/N is the radial offset of the servo fields (i.e. distance between two fields). In the following table, all numbers are of units nanometers, except for column "N" which is a number. Note that column M is the peak-to-peak amplitude 2*Wa of the spatial modulation of a sidewall (see FIG. 2A).

| Example | Wland | GAP | M | P | N | SP |
|---------|-------|-----|-----|-----|---|------|
| A | 80 | 40 | 30 | 120 | 3 | 40 |
| B | 80 | 40 | 30 | 120 | 4 | 30 |
| C | 80 | 80 | 30 | 160 | 3 | 53.3 |
| D | 80 | 80 | 30 | 160 | 4 | 40 |

In the above-described table, Example B requires ⅓ more real estate for the servo sector than Example A, but the error functions spacing is ¾ smaller, resulting in better overlap. Example D has a more extended error curve but the same error functions spacing as example A, and hence somewhat better overlap.

Figure 5A:
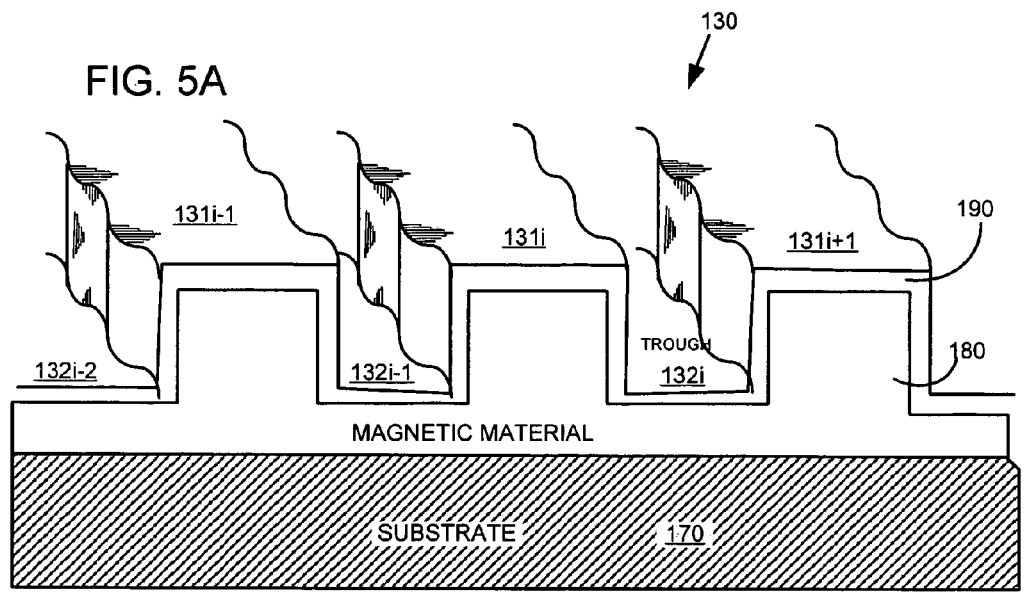
FIGS. 5A and 5B illustrate, in cross-sectional views, two alternative embodiments in accordance with the invention, wherein the magnetic layer is etched (FIG. 5A) to form gaps or the magnetic layer is made unmagnetizable (FIG. 5B) in lieu of gaps.
Figure 5B:
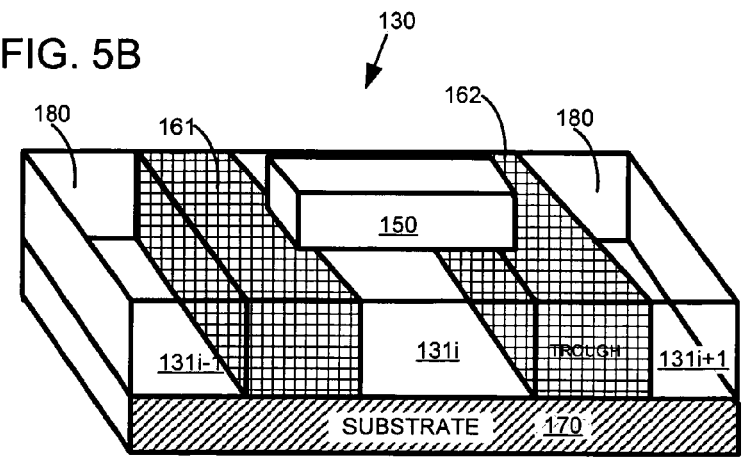

Numerous modifications and adaptations of the embodiments described herein will become apparent to the skilled artisan in view of this disclosure. For example, embossing is used in some embodiments to form disk 130, such a disk may be formed by other manufacturing methods as illustrated in FIGS. 5A and 5B. Specifically, in FIG. 5A, substrate 170 is flat, although the magnetic layer 180 and protective layer 190 have troughs 132$i$, 132$i$−1, 132$i$−2 etc. formed by, for example etching of layer 180 to implement gaps between lands.

In the embodiment shown in FIG. 5B, substrate 170 is also flat, but magnetic layer 180 has certain areas 161 and 162 that have been made unmagnetizable, e.g. by ion implantation. The unmagnetizeable areas 161 and 162 are solid regions which are in lieu of gaps between lands 131$i$−1, 131$i$ and 131$i$+1. Lands 131$i$−1, 131$i$ and 131$i$+1 of this embodiment are magnetizable and in fact are magnetized, as described above in reference to FIGS. 1A–1D. Specifically, in FIG. 5B, lands 131$i$−1, 131$i$ and 131$i$+1 form tracks that are magnetized, in the data sectors (and in servo sectors either magnetized or DC erased depending on the embodiment). Although unmagnetizable areas 161 and 162 are shown in FIG. 5B as being unmodulated (for ease of illustration), they are in fact spatially modulated in accordance with the invention (e.g. as shown in FIG. 5A), when present in a servo sector.

Moreover, although in some embodiments, a modulated servo sector of the type described herein is DC erased (i.e. magnetized in one direction), in other embodiments a high frequency carrier signal (e.g. 100 MHz) is encoded in magnetic layer 180. In such embodiments, the servo signal frequencies f1 and f2 are decoded from a signal that is sensed in the read element, as sidebands of the carrier signal. The specific frequencies f1 and f2 being sensed depend on the speed at which disk 130 is rotated by motor 105 (which is a design parameter of the disk drive).

Figure 4A:
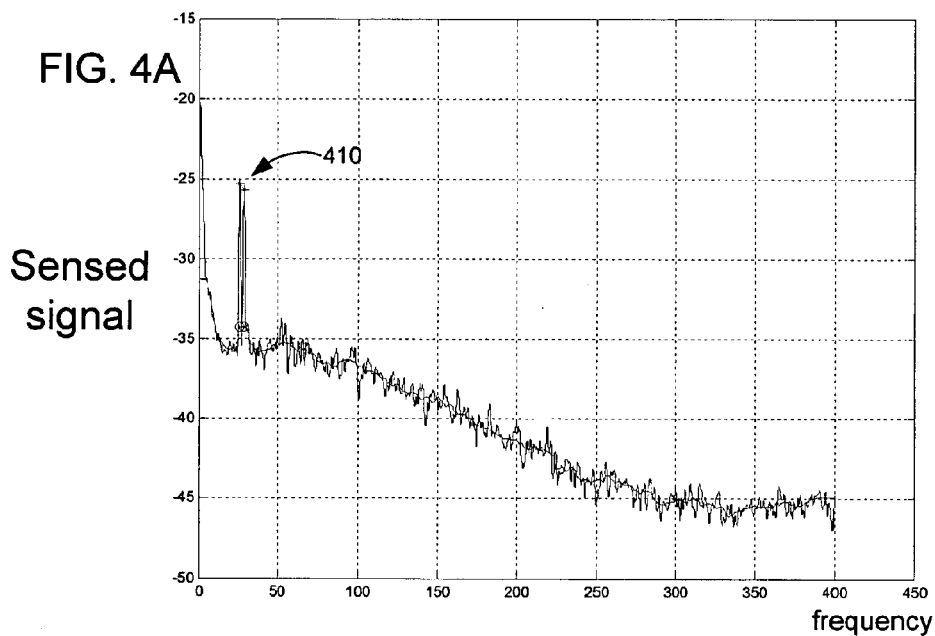
FIGS. 4A and 4B illustrate, in a graph, a signal (on the y axis) resulting from spatial modulation of sidewalls wherein the magnetic layer is DC erased, as sensed (FIG. 4A) and amplified (FIG. 4B), as a function of frequency (on the x axis).
Figure 4B:
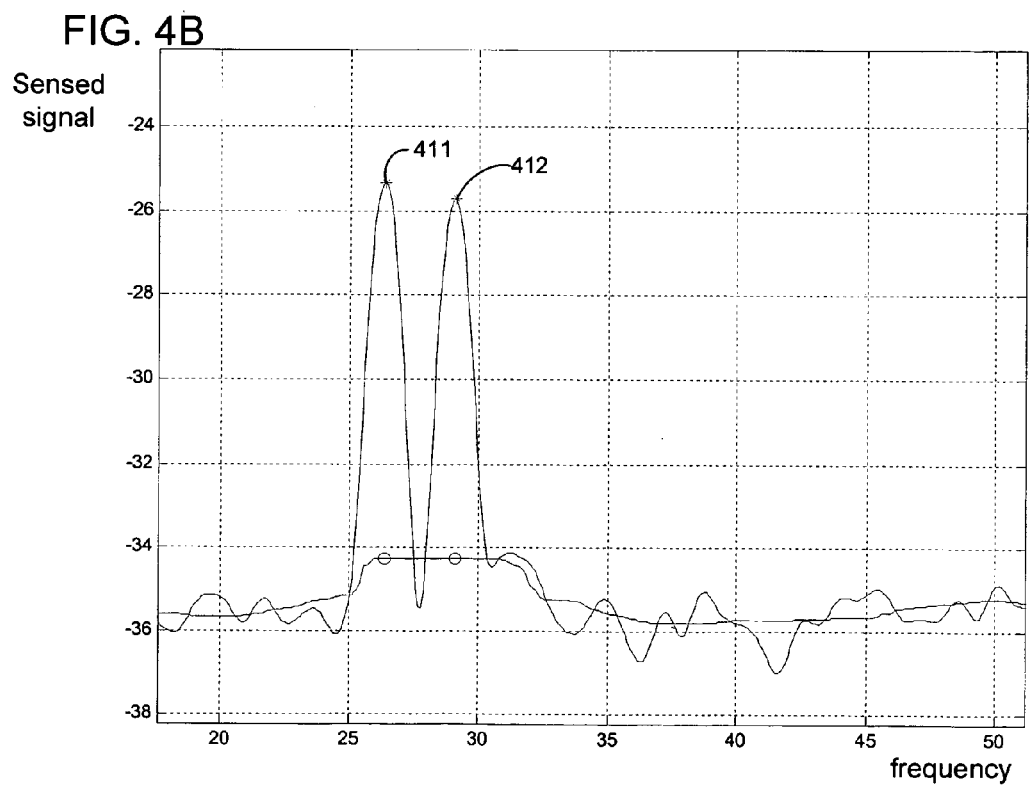

As shown in FIGS. 4A and 4B, two side bands 410 which when amplified are distinguishable individually as peaks 411 and 412 at 26 MHz and 28.6 MHz. Peaks 411 and 412 together represent the spatial modulation of the two sidewalls of a single track (i.e. single land) in a servo sector of this embodiment. Note that two peaks 411 and 412 are at the same amplitude when the head is centered on the track. A difference in amplitude between the two peak is used to center the head in some embodiments. In embodiments illustrated in FIGS. 4A and 4B, the magnetic layer is DC erased in the servo sector, and the signal being sensed has only one peak for each sidewall (two peaks total for each land), i.e. there are no sidebands.

In contrast, sidebands are present in an illustration shown in FIGS. 4C and 4D, wherein the track is magnetized with a carrier frequency f0 (which is 165.8 MHz as illustrated by peak 431), and f0 is identified from being the peak with the highest amplitude. In this illustration, two smaller peaks 432A and 432B on either side of this f0 peak 431 represent the contribution of one sidewall that is spatially modulated at frequency f2. This single sidewall generates the two peaks 432A and 432B at the respective frequencies f0+f2 and f0−f2. Another sidewall contributes two peaks 433A and 433B at the respective frequencies f0+f1 and f0−f1 due to being spatially modulated at frequency f1. In the illustration of FIGS. 4C and 4D, the values are f1=29.00 MHz and f2=26.36 MHz. Note that these same values of f1 and f2 are also used in FIGS. 4A and 4B.

In the non-zero carrier frequency embodiment illustrated in FIGS. 4C and 4D, the difference between each of the two adjacent peaks is averaged to obtain the feedback signal that centers a head on the track. Specifically, the difference in amplitude between peaks 432A and 433A is added to another difference in amplitude between peaks 433A and 433B and the resulting sum is halved to obtain the feedback signal (which is provided to actuator electronics module 109 shown in FIG. 1C).

Note also that in some embodiments, additional information other than just a carrier signal is further encoded into magnetic layer 180 of lands in the servo sectors. The additional information is used in identifying a track on which the head is currently flying. In one such embodiment, a carrier signal is recorded in the magnetic layer 180 in the servo sectors at 400 MHz, and 1 bit of information is embedded in the carrier signal in each sector (at 4 MHz) e.g. by aligning all magnetic domains of a servo sector in the direction of travel or opposite to the direction of travel. If a disk has 100 servo sectors in 360° then 100 bits of additional information may be encoded in this manner. These 100 bits encode a unique track identifier in this embodiment.

Also, although sidewalls are described above as being modulated in a continuous manner in servo sectors of some disks, other disks may spatially modulate their sidewalls in a discontinuous manner in their servo sectors, e.g. by modulating simply the presence and absence of a sidewall (i.e. modulation constitutes the sidewall being present or the sidewall being absent, thereby to provide a binary encoding). One such disk (FIG. 3C) uses spatial modulation wherein a land has an intermittently present sidewall on one side of length L1 (e.g. 100 nm) and another intermittently present sidewall on another side of a different length L2 (e.g. 150 nm). These two sidewalls generate square wave signals in a read element, of two different wavelengths that are detected by circuitry 102.

In some embodiments, a master disk is prepared in an e-beam recorder with an ability to wobble the beam or to switch the beam on and off. In these embodiments, the e-beam recorder forms predefined modulations at the edges of the lands in the servo sectors. Depending on the modulations being formed, limits on the amplitude and the periodicity of the modulation are imposed by the e-beam recorder, such as how fast the beam can be moved, how the resist responds to the exposure in dosage of the electrons etc. Hence these limits are taken into account in designing the modulation of sidewalls of the lands in disks of such embodiments.

Numerous modifications and adaptations of the embodiments described herein are encompassed by the scope of the invention and the attached claims.

Following is a list of certain symbols that have been used in the above description, and in the drawings:

Wa—amplitude of sidewall modulation
Wland—width of land
GAP—distance between the opposing sidewalls of adjacent lands
Wread-max—maximum width of a read element in a head
Wread-min—minimum width of the read element in the head
Wwrite-max—maximum width of a write element in the head
Wwrite-min—minimum width of the write element in the head
RTMR—track misregistration of the read element
WTMR—track misregistration of the write element
P—pitch, or the distance between two adjacent lands
N—number of servo fields in one pitch
1/N is the distance between fields in units of pitch.

What is claimed is:

1. A magnetic disk comprising:
a plurality of lands and a plurality of gaps formed in a magnetic film;
wherein each land is separated from an adjacent land by a gap;
wherein each land is partitioned into a plurality of servo sectors and a plurality of data sectors;
wherein each servo sector is separated from an adjacent servo sector by at least one data sector;
wherein each sidewall in each servo sector is modulated in space; and
wherein two sidewalls of each servo sector are modulated at two different frequencies.

2. The magnetic disk of claim 1 wherein:
the frequencies are within less than 50% of each other.

3. The magnetic disk of claim 1 wherein:
each servo sector comprises a plurality of fields; and
each field in a given servo sector is radially offset from an adjacent field in the given servo sector.

4. The magnetic disk of claim 3 wherein:
a radial offset between two adjacent fields in the given servo sector is less than the width of a land in the given servo sector.

5. The magnetic disk of claim 1 wherein:
each sidewall in each data sector is unmodulated in space.

6. A magnetic disk comprising:
a plurality of lands and a plurality of gaps formed in a magnetic film;
wherein each land is separated from an adjacent land by a gap;
wherein each land is partitioned into a plurality of servo sectors and a plurality of data sectors;
wherein each servo sector is separated from an adjacent servo sector by at least one data sector;
wherein each sidewall in each servo sector is modulated in space; and
wherein an amplitude of modulation of each sidewall is less than half of the width of a land.

7. The magnetic disk of claim 6 wherein:
each servo sector comprises a plurality of fields; and
each field in a given servo sector is radially offset from an adjacent field in the given servo sector.

8. The magnetic disk of claim 7 wherein:
a radial offset between two adjacent fields in the given servo sector is less than the width of a land in the given servo sector.

9. The magnetic disk of claim 6 wherein:
each sidewall in each data sector is unmodulated in space.

10. A disk drive comprising:
a magnetic disk comprising a plurality of tracks and a plurality of gaps formed in a magnetic film, each track being separated from an adjacent track by a gap, each track being partitioned into a plurality of servo sectors and a plurality of data sectors, each servo sector being separated from an adjacent servo sector by a data sector, each sidewall of each data sector being unmodulated, an inner sidewall of each servo sector being modulated sinusoidally at a first frequency, and an outer sidewall of each servo sector being modulated sinusoidally at a second frequency;
a magnetic head for recording a signal in and reading the signal back from each data sector in the magnetic disk; and
circuitry coupled to the magnetic head, the circuitry comprising a first detector for detecting a first signal from the magnetic head at the first frequency, a second detector for detecting a second signal from the magnetic head at the second frequency, the circuitry further comprising a comparator coupled to the first detector and to the second detector, for comparing a first amplitude of the first signal to a second amplitude of the second signal.

11. The disk drive of claim 10 wherein:
the head is sufficiently wide to sense each of two frequencies caused by modulation of two sidewalls of a land when the head is centered on the land.

12. The disk drive of claim 10 wherein:
the frequencies are within less than 50% of each other.

13. The disk drive of claim 10 wherein:
each servo sector comprises a plurality of fields; and
each field in a given servo sector is radially offset from an adjacent field in the given servo sector.

14. The disk drive of claim 10 wherein:
a radial offset between two adjacent fields in the given servo sector is less than the width of a land in the given servo sector.

15. The disk drive of claim 10 wherein:
each sidewall in each data sector is unmodulated in space.

* * * * *